US011942936B2

(12) United States Patent
Whiteley

(10) Patent No.: US 11,942,936 B2
(45) Date of Patent: Mar. 26, 2024

(54) ENERGY-EFFICIENT SFQ LOGIC BIASING TECHNIQUE

(71) Applicant: Synopsys, Inc., Mountain View, CA (US)

(72) Inventor: Stephen Robert Whiteley, Sunnyvale, CA (US)

(73) Assignee: Synopsys, Inc., Sunnyvale, CA (US)

( * ) Notice: Subject to any disclaimer, the term of this patent is extended or adjusted under 35 U.S.C. 154(b) by 294 days.

(21) Appl. No.: 17/438,280

(22) PCT Filed: Mar. 12, 2020

(86) PCT No.: PCT/US2020/022425
§ 371 (c)(1),
(2) Date: Sep. 10, 2021

(87) PCT Pub. No.: WO2020/186076
PCT Pub. Date: Sep. 17, 2020

(65) Prior Publication Data
US 2022/0149841 A1 May 12, 2022

Related U.S. Application Data

(60) Provisional application No. 62/817,227, filed on Mar. 12, 2019.

(51) Int. Cl.
H03K 19/195 (2006.01)
G06F 30/367 (2020.01)
(Continued)

(52) U.S. Cl.
CPC ......... H03K 19/195 (2013.01); G06F 30/367 (2020.01); G06N 10/00 (2019.01); H10N 60/12 (2023.02); G06F 2119/06 (2020.01)

(58) Field of Classification Search
CPC ..... H03K 19/195; G06F 30/367; H10N 60/12
See application file for complete search history.

(56) References Cited

U.S. PATENT DOCUMENTS 8,571,614 B1 * 10/2013 Mukhanov ............. H10N 60/12
29/829
2003/0039138 A1 2/2003 Herr
(Continued)

OTHER PUBLICATIONS

International Search Report for International Patent Application No. PCT/US2020/022425 dated Jul. 21, 2020, European Patent Office, The Netherlands, 4 pages.
(Continued)

Primary Examiner — Patrick O Neill
(74) Attorney, Agent, or Firm — Lowenstein Sandler LLP

(57) ABSTRACT

Disclosed herein are embodiments including electrical structures that includes a first cell, a first inductor, a first resistor, and a first shunted Josephson junction. The first inductor is connected in series with the first shunted Josephson junction at a first terminal end of the first inductor and a second terminal end of the first inductor is connected to a feed point of the first cell being powered. A first end of the first resistor having connected to ground and a second end being connected to the first shunted Josephson junction at a terminal of the first shunted Josephson junction that is not connected to the first inductor. A source of an electrical current source that is external to the first cell is connected to the first shunted junction and the first resistor at a common point.

14 Claims, 12 Drawing Sheets

(51) Int. Cl.
    *G06N 10/00*    (2022.01)
    *H10N 60/12*    (2023.01)
    *G06F 119/06*    (2020.01)

(56) References Cited

U.S. PATENT DOCUMENTS

2005/0040843 A1    2/2005    Eaton et al.
2016/0034609 A1    2/2016    Herr et al.
2019/0296743 A1*   9/2019    Pedram .............. H03K 19/1774

OTHER PUBLICATIONS

Written Opinion for International Patent Application No. PCT/US2020/022425, dated Jul. 21, 2020, European Patent Office, The Netherlands, 8 pages.

* cited by examiner

ENERGY-EFFICIENT SFQ LOGIC BIASING TECHNIQUE

CROSS-REFERENCE TO RELATED APPLICATIONS

This application is a national phase entry of International Application No. PCT/US2020/022425, filed Mar. 12, 2020, which claims the benefit under 35 U.S.C. § 119(e) of U.S. Provisional Application No. 62/817,227, filed on Mar. 12, 2019, each of which is incorporated herein by reference in their entirety.

STATEMENT UNDER MPEP § 310 REGARDING U.S. FEDERAL GOVERNMENT SPONSORED RESEARCH OR DEVELOPMENT

This invention was made with government support awarded by the United States (U.S.) Intelligence Advanced Research Projects Activity (IARPA). By way of a paid-up license, the U.S. government has certain rights to invention (s) claimed herein. More specifically, the U.S. government may, in limited circumstances, require the patent owner to license technology covered by this patent to others on reasonable terms as provided by the terms of Contract No. W911NF-17-9-0001 awarded by IARPA.

FIELD(S) OF TECHNOLOGY

This disclosure has significance in the field of electronics in general, including the following topics: electronic design automation, superconductive circuitry, and biasing techniques for energy-efficient rapid single flux quantum (ERSFQ) circuits.

BACKGROUND

It is well known that digital logic systems can be implemented with superconducting circuitry based on Josephson junctions. Although the technology has its challenges, one of the major potential benefits is greatly reduced power consumption relative to semiconductor technologies, despite the fact that Josephson systems require operation at temperatures close to absolute zero. It is for this reason that there is much recent interest in Josephson technology, for example, the IARPA SuperTools program, which seeks to develop a comprehensive set of Electronic Design Automation (EDA) and Technology Computer-Aided Design (TCAD) tools for Very-Large-Scale-Integration (VLSI) design of superconducting electronic circuits, a program in which the applicant, Synopsys, plays a leading role.

There are several Josephson logic families that are being developed and championed by different organizations, each with advantages and disadvantages relative to each other. Reciprocal Quantum Logic (RQL), and Adiabatic Quantum Flux Parametron (AQFP), are two such examples. The third primary technology is Single Flux Quantum (SFQ) logic, which comes in different flavors, including Rapid or Resistive SFQ (RSFQ) and Energy-Efficient SFQ (ERSFQ or EERSFQ). The SFQ circuits can be biased with direct current, while the others require a multi-phase microwave power signal, which must be routed to a large number of gates while maintaining timing accuracy and amplitude. In comparison to the SFQ circuitry biased with direct current, circuits based on the multi-phase microwave power signal are technically more challenging.

RSFQ was the original SFQ approach, where 'R' stands for "resistive," or "rapid." This logic was invented in the 1980s, and work continues using this same basic approach as it requires the simplest biasing circuitry. It has the disadvantage of relatively high power dissipation.

The ERSFQ approach was proposed as a lower-power SFQ derivative, which has approximately an order of magnitude less power consumption compared to standard RSFQ. The ERSFQ family, in use for over a decade, uses an on-chip voltage regulator implemented as a Josephson Transmission Line (JTL), referred to herein as a "feeding JTL." One purpose of the feeding JTL is to implement a very low voltage (tens of microvolts) on-chip source, which by keeping chip bias voltage very low, ensures that power dissipation is also low. However, the feeding JTL itself may require significant operating current and contribute substantially to circuit area requirement and component count. Consequently, this regulation method may have substantial disadvantages in these regards.

DRAWINGS

The following Detailed Description, Figures, and Claims signify the uses and advantages of the claimed inventions and their embodiments. All of the Figures are used only to provide knowledge and understanding and do not limit the scope of the claimed inventions and their embodiments. Such Figures are not necessarily drawn to scale.

Similar components or features used in the Figures can have the same or similar reference signs in the form of labels (such as alphanumeric symbols, e.g., reference numerals), and can signify a similar or equivalent use. Further, various components of the same type can be distinguished by following the reference label by a dash and a second label that distinguishes among the similar components. If only the first reference label is used in the Specification, its use applies to any similar component having the same first reference label irrespective of the second reference label. A brief description of the Figures is below.

Figure 1:
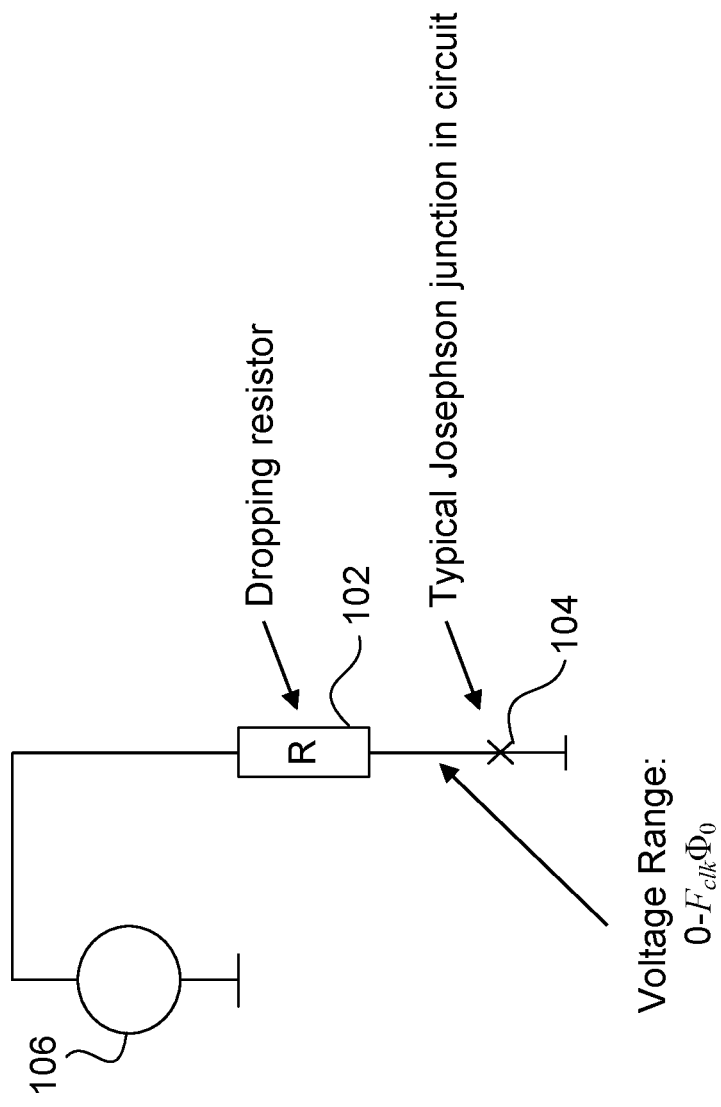
FIG. 1 illustrates an example of powered rapid single flux quantum (RSFQ) circuitry.

In the drawings, reference signs can be omitted as is consistent with accepted engineering practice; however, a skilled person will understand that the illustrated components are readily understood when viewed in the context of the illustration as a whole and the accompanying disclosure describing such various figures.

DETAILED DESCRIPTION

The Figures and Detailed Description signify, only to provide knowledge and understanding, the claimed inventions. To minimize the length of the Detailed Description, while various features, structures, or characteristics can be described together in a single embodiment, they also can be used in other embodiments without being written about. The Figures and Detailed Description also can signify, implicitly or explicitly, advantages and improvements of the claimed inventions and their embodiments.

In the Figures and Detailed Description, numerous specific details can be described to enable at least one embodiment of the claimed inventions. Any embodiment disclosed herein signifies a tangible form of a claim invention. To not obscure the significance of the embodiments and/or examples in this Detailed Description, some elements that are known to a skilled person can be combined together for presentation and for illustration purposes and not be described in detail. To not obscure the significance of these embodiments and/or examples, some well-known processes, machines, systems, manufactures, or compositions are not written about in detail. Thus, the Detailed Description focuses on enabling the distinctive elements of the claimed inventions and exemplary embodiments. Where this Detailed Description refers to some elements in the singular tense, more than one element can be depicted in the Figures, and like elements are labeled with like numerals.

In this disclosure, various embodiments based on the ERSFQ (Energy Efficient RSFQ) approach are detailed as a lower-power SFQ derivative. This has approximately an order of magnitude less power consumption than is possible with standard RSFQ.

DETAILED DESCRIPTION—RSFQ BIASING CIRCUITRY

FIG. 1 illustrates a method of powering rapid single flux quantum (RSFQ) circuitry. FIG. 1 illustrates an RSFQ circuit 100 with a dropping resistor 102 and a bias voltage source 106. Due to the dropping resistor 102, the RSFQ circuit 100 has a high power dissipation. The bias voltage source 106, as shown in FIG. 1, is connected to the dropping resistor 102, which is connected to a Josephson junction 104. Even though, only one instance of the dropping resistor 102 and the Josephson junction 104 are shown in FIG. 1, the RSFQ circuit may have a plurality of similar Josephson junction 104, each connected with a dropping resistor similar to the dropping resistor 102. By way of non-limiting example, for the RSFQ circuit 100, the bias voltage source 106 may be provided off-chip.

The time-averaged voltage across Josephson junction 104 may range from 0 volts, when the Josephson junction is not switching at all, to a voltage proportional to the system clock frequency when the Josephson junction pulses on every clock cycle. The average voltage across a Josephson junction depends on the frequency of pulsing with a proportionality constant that is twice the electron charge divided by Planck's constant, or about 500 MHz per microvolt.

Accordingly, the bias current is obtained from the voltage source 106 through use of a dropping resistor 102. The values of the voltage source 106 and the dropping resistor 102 specify the biasing current. For the RSFQ circuit 100, the average voltage across the dropping resistor 102 may vary according to the switching probability of the Josephson junction 104 and may cause the bias current supplied to the Josephson junction 104 to change correspondingly. The change of the bias current through the Josephson junction 104 may cause spurious triggering or lack of an expected triggering. Accordingly, to prevent the spurious triggering or lack of the expected triggering, the bias source voltage 106 may be required to be at least ten times higher than the voltage corresponding to the system clock frequency. Accordingly, the dropping resistor 104 may dissipate at least 90 percent of chip power as heat in a very low-temperature environment.

DETAILED DESCRIPTION—JOSEPHSON JUNCTION AS A CURRENT SOURCE

In some embodiments, by way of non-limiting example, a Josephson junction as a current source may be used as a constant current bias to the circuit junction. In this case, when the on-chip voltage is kept low, the total power dissipation may be lower compared to using the dropping resistor 102. By way of non-limiting example, the total power dissipation may be about ten times lower than the total power dissipation with the dropping resistor.

Figure 2:
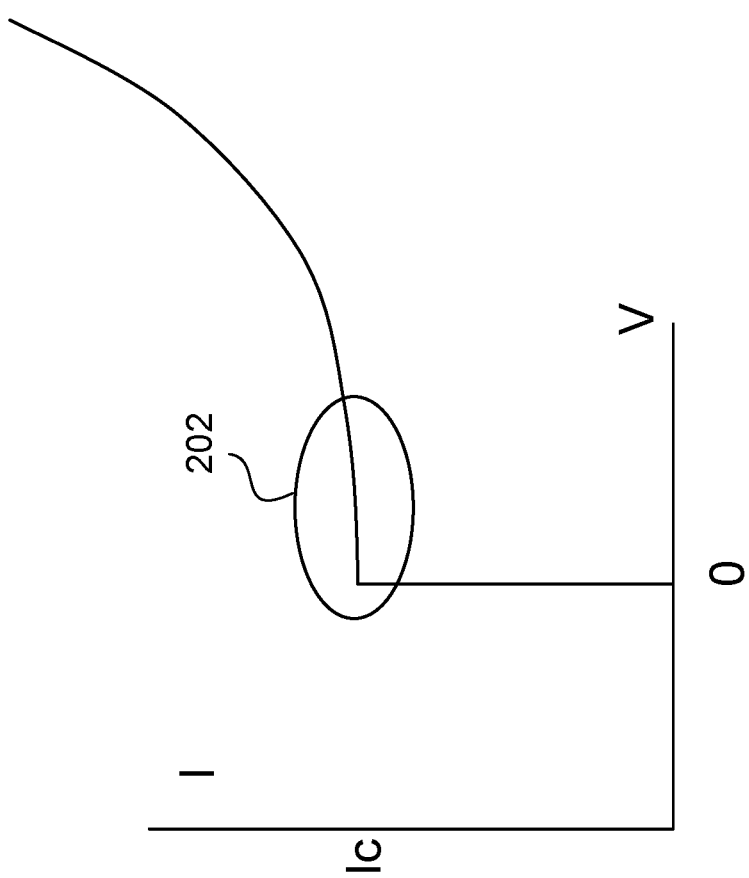
FIG. 2 illustrates current-voltage (I-V) characteristics of a shunted Josephson junction as a current source, according to an exemplary embodiment of the present disclosure.

FIG. 2 illustrates current-voltage (I-V) characteristics of a shunted Josephson junction as a current source, in accordance with some embodiments. The current source is evident from the I-V characteristic of the shunted Josephson junction that shows average current changes are very small compared to voltage changes, as shown in FIG. 2 by 202. In other words, a ratio of a difference in current to a difference in voltage (di/dv) is almost zero when the voltage across the Josephson junction as the current source is kept low. Accordingly, the power dissipation is kept low, while the current flowing through the Josephson junction may be controlled to be the same as the critical current required for the Josephson junction. In addition to the constant DC current, there will be a large AC current, which may be filtered out to prevent interfering of the circuit being biased. The AC current may be filtered out by inductance placed in series with the Josephson junction.

Figure 3:
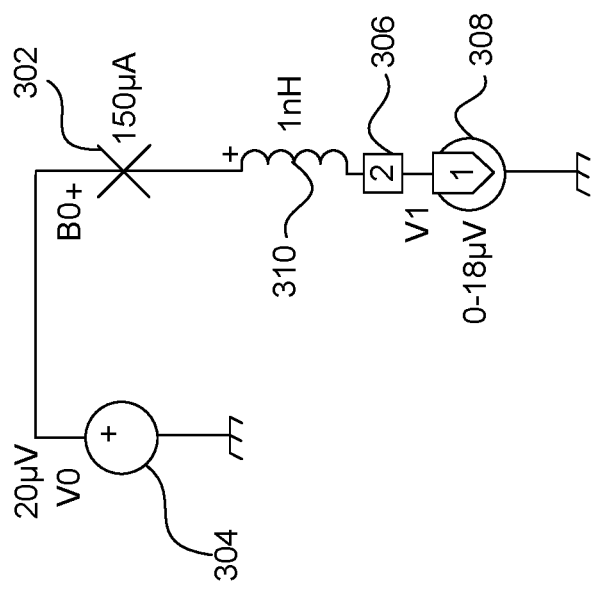
FIG. 3 illustrates a simulation of a Josephson current source element, according to an exemplary embodiment of the present disclosure.

FIG. 3 illustrates a simulation of a Josephson current source element, in accordance with some embodiments. The simulation of the Josephson current source element may be performed using a circuit simulator. One example of such a circuit simulator may be WRspice Circuit Simulator from Whiteley Research Inc. The circuit simulator may accept as an input circuit description using Simulation Program with Integrated Circuit Emphasis (SPICE) specification language. As shown in FIG. 3, the Josephson junction 302 being biased is connected to a constant voltage source 304. Another voltage source (308), which may be time-varying, is used to model the Josephson junction anticipated as the load. The voltage across the voltage source 308 may be changing so that an effect of the voltage change across the junction may be simulated. By way of non-limiting example, the voltage of the other voltage source 308 may change from 0 volt to 18 microvolts and back, and the voltage of the voltage source 304 may be 20 microvolts. Accordingly, an average voltage across the Josephson current source may change by a factor of 10, in this case.

Figure 4:
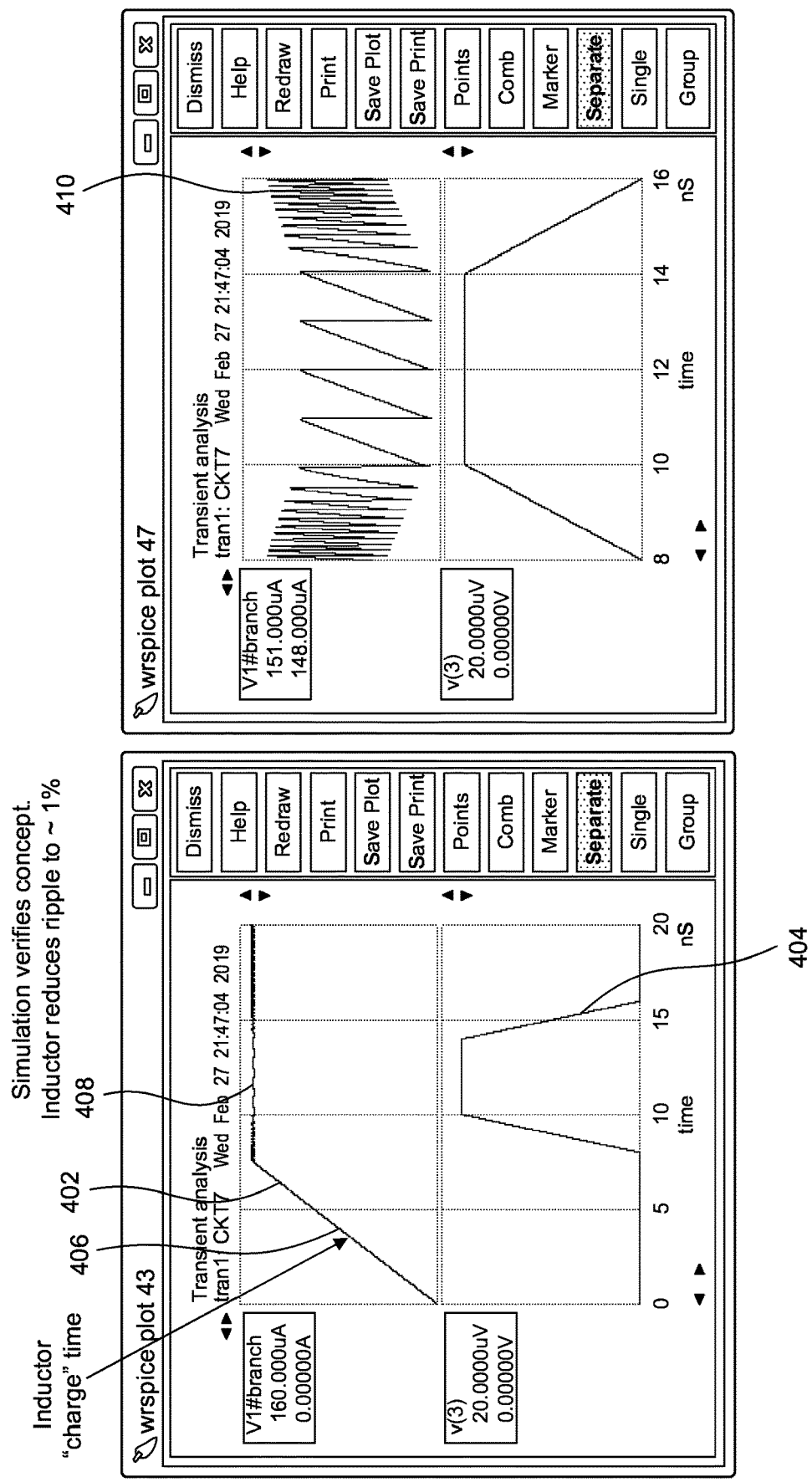
FIG. 4 illustrates current and voltage characteristics for the Josephson current source element of FIG. 3, according to an exemplary embodiment of the present disclosure.

FIG. 4 shows a current graph 402 that indicates the current through the current source at point 306 and a voltage graph 404 that indicates the voltage measured at point 308. As shown in FIG. 4, long ramp-up 406 is due to a filter inductor 310, for example, of value 1 nanoHenry, charging up from the voltage source 304. As shown in FIG. 4, the bias current may contain ripple 408 of about 1 percent, which is shown as zoomed-in ripple 410. However, the bias current ripple 408, 410 may be reduced by using a large inductance filter.

Figure 5:
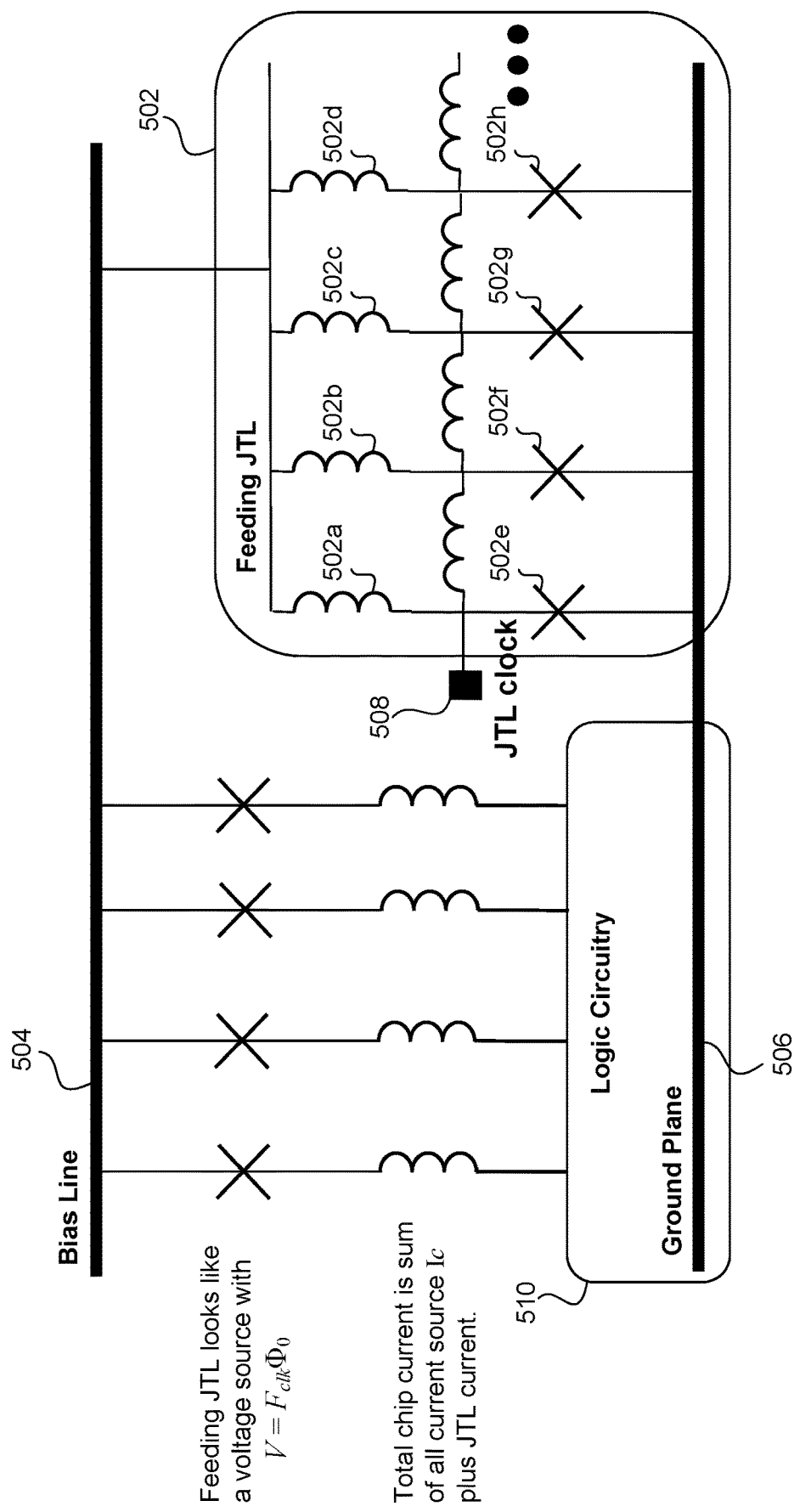
FIG. 5 illustrates an electrical structure using a feeding Josephson transmission line (JTL).

FIG. 5 illustrates an example of feeding JTL regulating voltage on bias line. FIG. 5 shows a feeding JTL 502, a bias line 504, a ground plane 506, a JTL clock 508, and logic circuitry 510. The feeding JTL 502 is driven by the JTL clock 508. The JTL clock 508 may be in addition to a system clock, and the frequency of the JTL clock 508 may set the voltage across the feeding JTL and bias voltage for the bias line 504. However, any benefit of precise voltage regulation by the feeding JTL 502 using conventional techniques may be outweighed by the complexity and additional power dissipation of the feeding JTL 502. The feeding JTL is used to establish a known reference voltage from which to power the SFQ circuitry, however as shown below this can be replaced by a more efficient approach.

DETAILED DESCRIPTION—JOSEPHSON JUNCTION AS A CURRENT SOURCE WITH A RESISTOR TO GROUND

Figure 6:
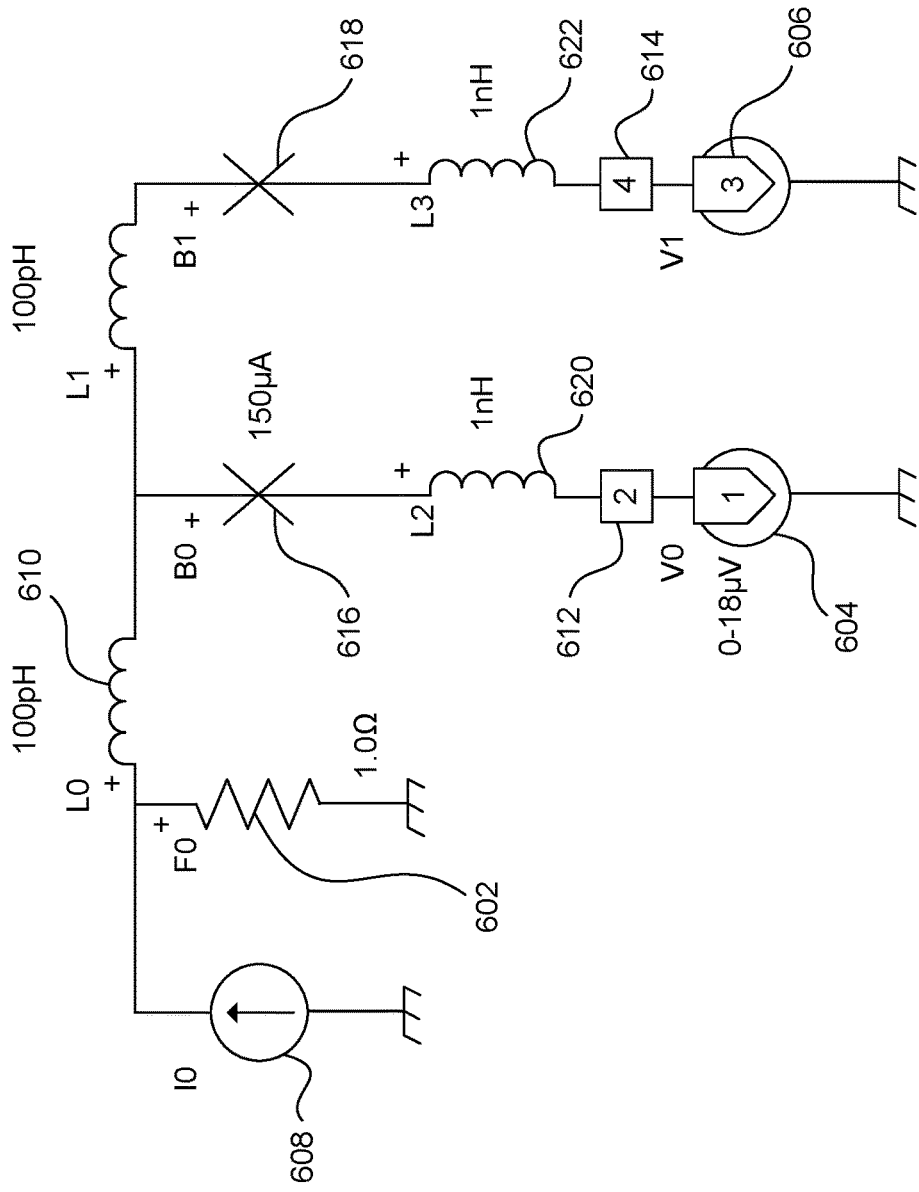
FIG. 6 illustrates an electrical structure, according to an exemplary embodiment of the present disclosure.

In FIG. 6, the feeding JTL 502 may be removed and replaced by a resistor 602, according to some embodiments. Such replacement of the feeding JTL 502 by the resistor 602 may free substantial circuit area, since none of the JTL clock 508 and associated inductors 502a through 502h are needed. By way of non-limiting example, each bias feed point may have an added resistor to ground, and approximately 10 percent of the overall chip bias current may flow through a plurality of resistors to ground. The plurality of resistors to the ground may provide a well-defined bias voltage when the chip is biased by a relatively high impedance source. Further, the on-chip voltage may not be clamped as it generally occurs in the feeding JTL, rather the on-chip voltage may vary with the changing bias current. The voltage across the resistor 602 is the "excess" current not consumed by a Josephson junction current source 608 times the value of the resistance. Since the resistor 602 is in parallel to the Josephson junction and the bias line, the on-chip voltage may be provided according to the expectations by adjusting the bias current.

Even though the feeding JTL and the embodiments described herein, both may use resistors as part of the biasing network, the embodiments described herein differ from the feeding JTL. For example, the feeding JTL may use dropping resistors 102, which appear in series with the Josephson junction 104. The values of the dropping resistors may be high and may cause the dropping resistors to appear as a current source to the load. On the other hand, in biasing circuitry described herein with reference to various embodiments, an actual current source may be provided, and resistors with small resistance to the ground may be used to control the voltage at the feed point. Because only a small amount of current may be needed to flow through these resistors to ground, the power dissipation is small. By way of non-limiting example, the power dissipation through the resistors to the ground may be approximately 10 percent of the total power dissipation. Further, the resistor to ground 602 used in the embodiments is of very small value compared to the dropping resistor 104. Therefore, the resistor to the ground used in the embodiments may require substantially less circuit area. Thus, the resistor to ground to drain the excess current may allow using the Josephson junction current source to replace the functionality of dropping resistor.

In some embodiments, when the feeding JTL 502 is replaced by a resistor to ground 602, about 25 percent of the Josephson junctions required by an ERSFQ logic chip may be eliminated. Along with the elimination of the Josephson junctions, associated inductors may also be eliminated, which may free up substantial chip area for additional circuitry and functionality, or a small die size may be used for the chip minimizing the overall circuit.

Figure 7:
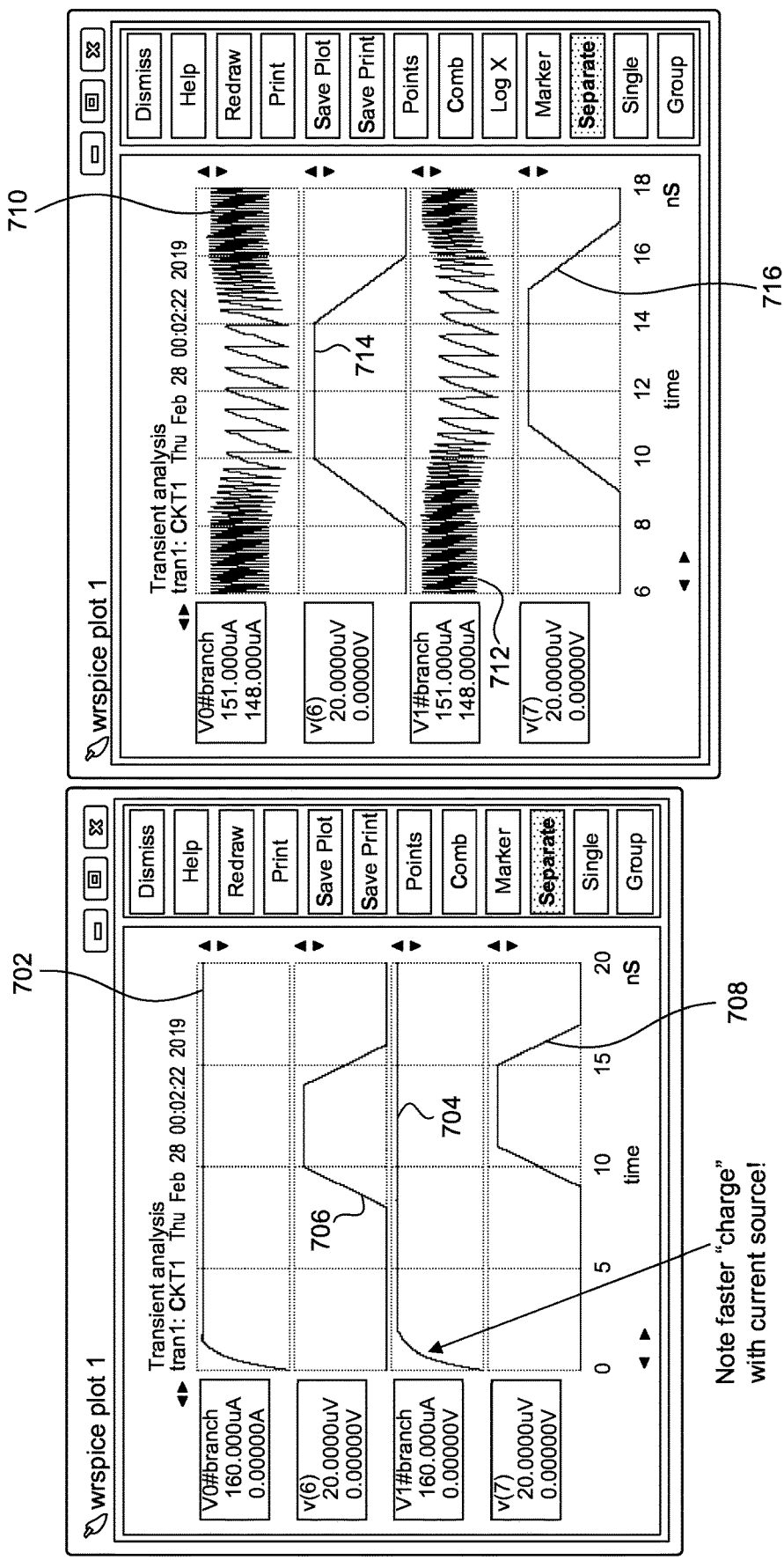
FIG. 7 illustrates current and voltage characteristics for the electrical structure of FIG. 6, according to an exemplary embodiment of the present disclosure.

FIG. 7 illustrates current and voltage characteristics for the electrical structure of FIG. 6, according to an exemplary embodiment of the present disclosure. As described above, the feeding JTL 502 may provide precise regulated voltage, but requires more circuit area. In comparison to the feeding JTL 502, the voltage measured at points 504 and 506 shows that the voltage at points 604 and 606 may not be as precise as available using the feeding JTL 502. However, a lack of precise voltage control is not known to be associated with any adverse effect during testing. This is because the system power supply regulator may provide and control the power needed to accommodate the system clock frequency. Also, current flow measured at points 612 and 614 for each bias feed branch, and voltage measured at points 604 and 604 are shown as graphs 702, 704, 706, and 708, respectively, in FIG. 7. A zoomed-in version of graphs 702, 704, 706, and 708 are also shown as 710, 712, 714, and 716, respectively. As described above, the current ripple shown in 710 and 712 remains less than 1 percentage. In other words, the current flow remains constant across the Josephson junctions 616 and 618. The current flow remains constant even in the presence of excess inductance, for example, inductors 620 and 622 placed to simulate a bias line, which may be a narrow and meandering strip in the chip layout. Further, as seen from voltage graphs 706 and 708, or 714 and 716, the time required to charge the inductors up to their quiescent currents is significantly reduced.

Based on the above disclosure, in some embodiments, a parameterized power distribution point cell may be designed for use in Electronic Design Automation (EDA) systems.

Figure 8:
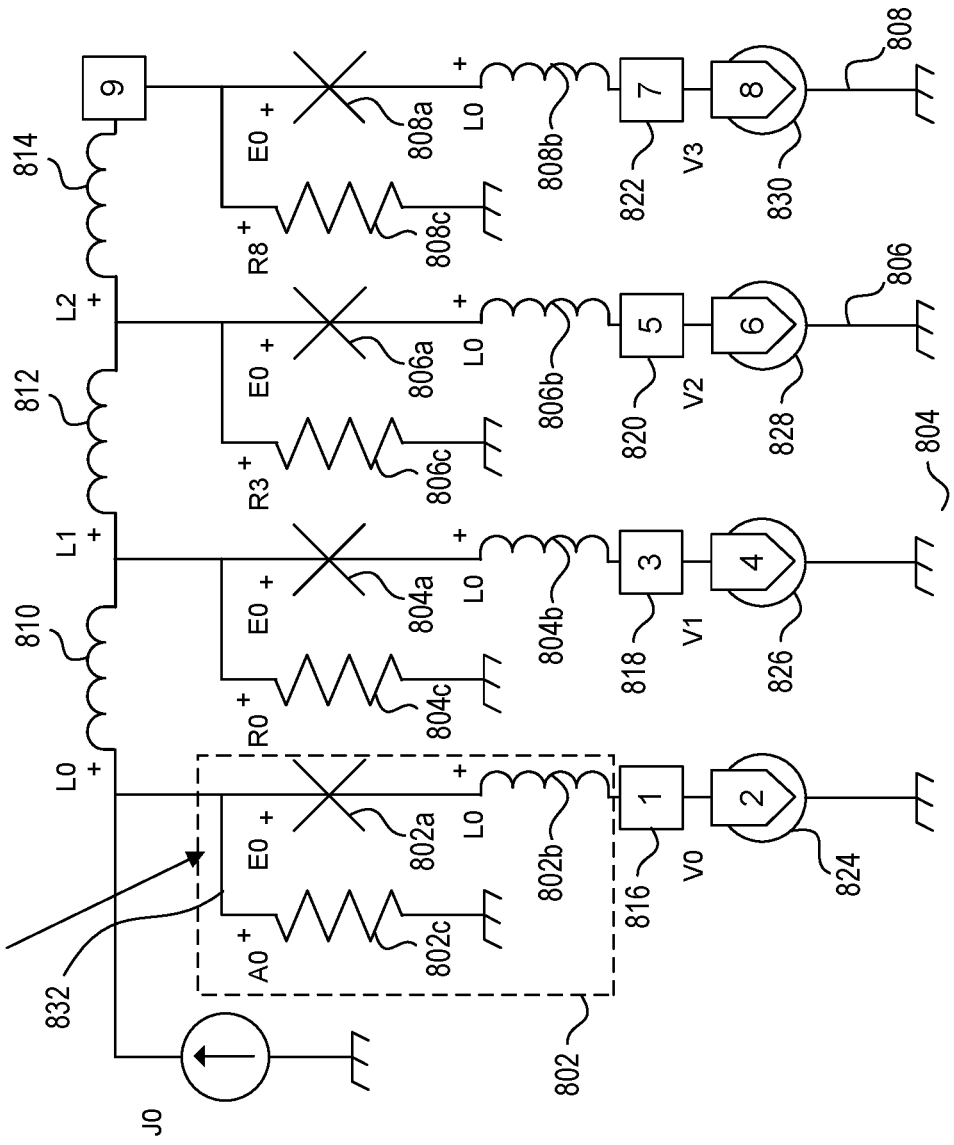
FIG. 8 illustrates another electrical structure, according to an exemplary embodiment of the present disclosure.

FIG. 8 illustrates four power distribution point cells, in accordance with some embodiments. As shown in FIG. 8, four power distribution point cells 802, 804, 806, and 808 simulate the circuit load. Each power distribution point cell 802, 804, 806, and 808 may include a current source Josephson junction, for example, 802a, 804a, 806a, and 808a, the filter inductor for example, 802b, 804b, 806b, and 808b), and a resistor to the ground, for example, 802c, 804c, 806c, and 808c. The value of resistor to the ground and the junction critical current are set by the cell parameter, which is the current delivered by the power distribution cell. There is no additional circuitry required for the power distribution system, and the actual inductance of the power supply lines on-chip 810, 812, and 814 can be incorporated into the schematic.

Figure 9:
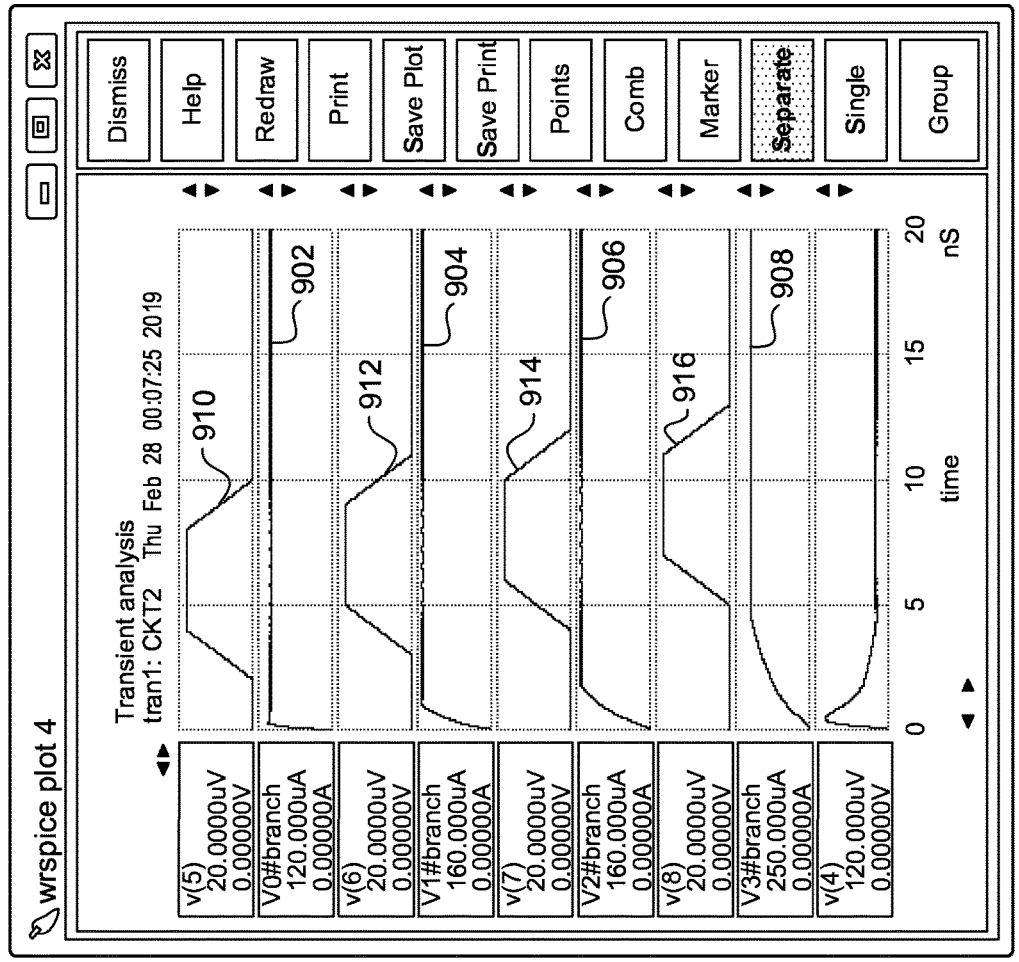
FIG. 9 illustrates characteristics of voltage over time for the electrical structure of FIG. 8, according to an exemplary embodiment of the present disclosure.

FIG. 9 illustrates characteristics of voltage over time for the electrical structure of FIG. 8, according to an exemplary embodiment of the present disclosure. Simulation and measurement of current at points 816, 818, 820, and 822, and voltage at points 824, 826, 828, and 830 shown in FIG. 9 as

902, 904, 906, 908, 910, 912, 914, and 916, respectively, which may be consistent with similar current and voltage characteristics, for example, shown in FIG. 7.

Finally, a logic circuit based on the embodiments disclosed herein may require much less circuit area since it requires much fewer components and circuitry in comparison to a logic circuit with the feeding JTL. Further, since at least 25 percentage of Josephson junctions may be eliminated, and the overall cost of the logic circuit may be reduced while increasing yield.

Data and Information. While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture. Data and information are physical, for example, binary data (a 'bit,' usually signified with '0' and '1') enabled with two different levels of voltage in a circuit. For example, data can be enabled as an electrical, magnetic, optical, or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . .").

As used herein, the term 'component' (also signified by 'part,' and typically signified by 'element' when described in a patent text or diagram) signifies a physical object that is used to enable a process in combination with other components. For example, electronic components are used in processes that affect the physical state of one or more electromagnetic or quantum particles/waves (e.g., electrons, photons) or quasiparticles (e.g., electron holes, phonons, magnetic domains) and their associated fields or signals. Electronic components have at least two connection points to which are attached 'leads,' typically a conductive wire or an optical fiber, with one end attached to the component and the other end attached to another component, typically as part of a circuit with current flows. There are at least three types of electrical components: passive, active, and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors, and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit,' 'IC,' 'chip,' 'microchip,' and 'System on Chip' ('SoC'). Examples of types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information. For example, the term 'module' can signify a process that transforms data and information, for example, a process comprising a computer program. The term 'module' also can signify one or more interconnected electronic components, such as digital logic devices. A process comprising a module, if specified in a programming language, such as SystemC or Verilog, also can be transformed into a specification for a structure of electronic components that transform data and information that produce the same result as the process."

A module is permanently structured (e.g., circuits with unalterable connections), temporarily structured (e.g., circuits or processes that are alterable with sets of data), or a combination of the two forms of structuring. Permanently structured modules can be manufactured, for example, using Application-Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilinx or Intel's Altera), Random Access Memories (RAMs) or microprocessors. For example, data and information are transformed using data as an address in RAM or ROM memory that stores output data and information. One can embed temporarily structured modules in permanently structured modules (for example, an FPGA embedded into an ASIC).

Modules that are temporarily structured can be structured during multiple time periods. For example, a processor comprising one or more modules has its modules first structured by a manufacturer at a factory and then further structured by a user. The processor can comprise a set of one or more modules during a first time period, and then be restructured to comprise a different set of one or modules during a second time period. The decision to manufacture or implement a module in a permanently structured form, in a temporarily structured form, or in a combination of the two forms, depends on issues such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine that physically transforms, transfers, and/or transmits data and information, using at least one process. A processor consists of one or more modules (e.g., a central processing unit, 'CPU,' an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor,' it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR, and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing, and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors, and computers. Programming languages include assembler instructions, instruction-set-architecture instructions, machine instructions, machine-dependent instructions, microcode, firmware instructions, state-setting data, or either source code or object code written in any combination of one or more higher-level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as GitHub.

As used herein, the term 'program' (also referred to as an 'application program') signifies one or more processes and data structures that structure a module, processor or computer to be used as a "specific machine.". One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language.

A program is transferred into one or more memories of the computer or computer system from a data and information device or storage system. A computer system typically has a device for reading storage media that is used to transfer the program and/or has an interface device that receives the program over a network.

Figure 11A:
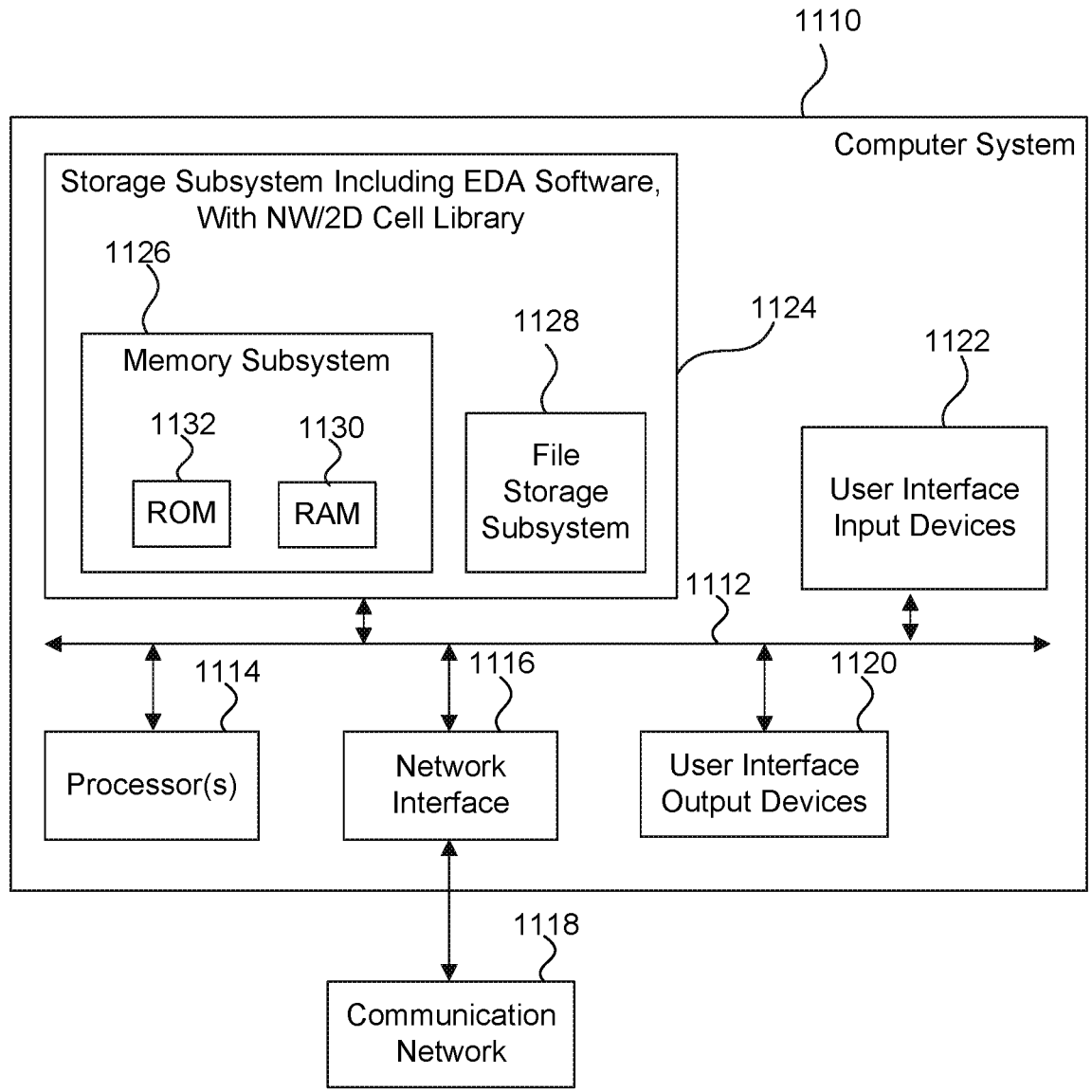
FIGS. 11A and 11B illustrate abstract diagrams of a computer system for embodiments of the claimed inventions, as well as an embodiment of circuit design and an embodiment of a manufactured circuit used in this disclosure.
Figure 11B:
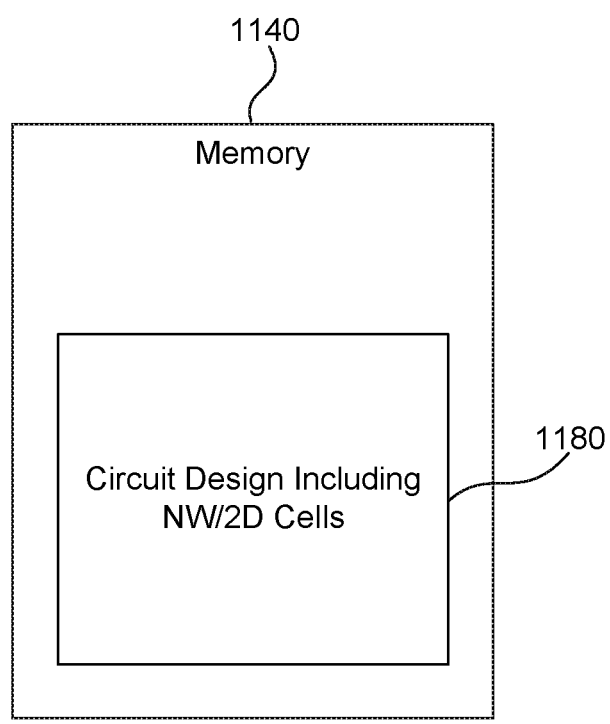

FIGS. 11A and 11B are diagrams of example computer systems suitable for enabling embodiments of the claimed inventions.

In FIG. 11A, the structure of a computer system 1110 typically includes at least one computer 1114, which communicates with peripheral devices via bus subsystem 1112. Typically, the computer includes a processor (e.g., a microprocessor, graphics processing unit, or digital signal processor), or its electronic processing equivalents, such as an Application Specific Integrated Circuit ('ASIC') or Field Programmable Gate Array ('FPGA'). Typically, peripheral devices include a storage subsystem 1124, comprising a memory subsystem 1126 and a file storage subsystem 1128, user interface input devices 1122, user interface output devices 1120, and/or a network interface subsystem 1116. The input and output devices enable direct and remote user interaction with the computer system 1110. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade,' a kiosk, a television, a game station, a network router, switch or bridge, or any data processing machine with instructions that specify actions to be taken by that machine. The term 'server,' as used herein, refers to a computer or processor that typically performs processes for, and sends data and information to, another computer or processor.

A computer system typically is structured, in part, with at least one operating system program, such as Microsoft's Windows, Sun Microsystems's Solaris, Apple Computer's macOS and iOS, Google's Android, Linux and/or Unix. The computer system typically includes a Basic Input/Output System (BIOS) and processor firmware. The operating system, BIOS, and firmware are used by the processor to structure and control any subsystems and interfaces connected to the processor. Typical processors that enable these operating systems include the Pentium, Itanium, and Xeon processors from Intel; the Opteron and Athlon processors from Advanced Micro Devices; the Graviton processor from Amazon; the POWER processor from IBM; the SPARC processor from Oracle; and the ARM processor from ARM Holdings.

The claimed inventions and their embodiments are limited neither to the electronic digital logic computer structured with programs nor to an electronically programmable device. For example, the claimed inventions can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 1110 depicted in FIG. 11A is intended only as an example. Many other structures of computer system 1110 have more or fewer components than the computer system depicted in FIG. 11A.

Network interface subsystem 1116 provides an interface to outside networks, including an interface to a communication network 1118, and is coupled via communication network 1118 to corresponding interface devices in other computer systems or machines. Communication network 1118 can comprise many interconnected computer systems, machines, and physical communication connections (signified by 'links'). These communication links can be wireline links, optical links, wireless links (e.g., using the Wi-Fi or Bluetooth protocols), or any other physical devices for communication of information. Communication network 1118 can be any suitable computer network, for example, a wide area network such as the Internet and/or a local-to-wide area network such as Ethernet. The communication network is wired and/or wireless, and many communication networks use encryption and decryption processes, such as is available with a virtual private network. The communication network uses one or more communications interfaces, which receive data from and transmit data to other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. Communication algorithms ('protocols') can be specified using one or communication languages, such as HTTP, TCP/IP, RTP/RTSP, IPX, and/or UDP.

User interface input devices 1122 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into the computer system 1110 or onto communication network 1118. User interface input devices typically enable a user to select objects, icons, text, and the like that appear on some types of user interface output devices, for example, a display subsystem.

User interface output devices 1120 can include a display subsystem, a printer, a fax machine, or a non-visual communication device such as audio and haptic devices. The display subsystem can include a cathode ray tube (CRT), a flat-panel device such as a liquid crystal display (LCD), an image projection device, or some other device for creating visible stimuli such as a virtual reality system. The display subsystem also can provide non-visual stimuli such as via audio output, aroma generation, or tactile/haptic output (e.g., vibrations and forces) devices. Typically, the term 'output device' signifies all possible types of devices and processes to transfer data and information out of computer system 1110 to the user or to another machine or computer system. Such devices are connected by wire or wirelessly to a computer system. Note: some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits that use any of the above input or output devices.

Memory subsystem 1126 typically includes a number of memories including a main random-access memory ('RAM') 1130 (or other volatile storage devices) for storage of instructions and data during program execution and a read-only memory (ROM') 1132 in which fixed instructions are stored. File storage subsystem 1128 provides persistent storage for program and data files and can include a hard disk drive, a floppy disk drive along with associated removable media, a CD-ROM drive, an optical drive, a flash memory such as a USB drive, or removable media cartridges. If computer system 1110 includes an input device that performs optical character recognition, then text and symbols printed on paper can be used as a device for storage of program and data files. The databases and modules used by some embodiments can be stored by file storage subsystem 1128.

Bus subsystem 1112 provides a device for transmitting data and information between the various components and subsystems of computer system 1110. Although bus subsystem 1112 is depicted as a single bus, alternative embodiments of the bus subsystem can use multiple busses. For example, a main memory using RAM can communicate directly with file storage systems using Direct Memory Access (DMA') systems.

FIG. 11B depicts a memory 1140 such as a non-transitory, processor-readable data and information storage medium associated with file storage subsystem 1128, and/or with network interface subsystem 1116, and can include a data structure specifying a circuit design. The memory 1140 can be a hard disk, a floppy disk, a CD-ROM, an optical medium, removable media cartridge, or any other medium that stores computer-readable data in a volatile or non-volatile form, such as text and symbols on paper that can be processed by an optical character recognition system. In some examples, the memory 1140 may include a plurality of cells 1180 to store data. A program transferred in to and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

Figure 10:
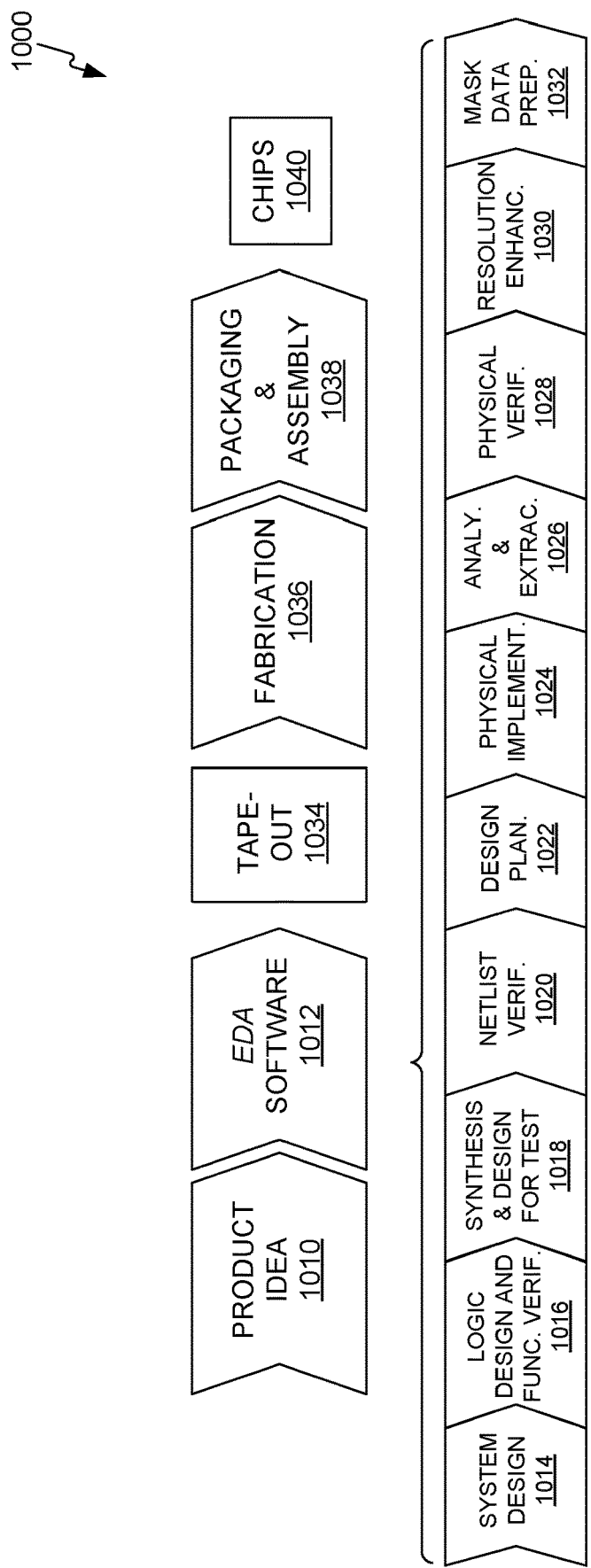
FIG. 10 illustrates a flow-chart of various processes used during the design and fabrication of an integrated circuit, according to an exemplary embodiment of the present disclosure.

FIG. 10 depicts a set of processes 1000 used during the design, verification, and fabrication of an article of manufacture such as an integrated circuit to transform and verify design data and instructions that represent the integrated circuit. Each of these processes can be structured and enabled as multiple modules. The term 'EDA' signifies the term 'Electronic Design Automation.' These processes start with the creation of a product idea 1010 with information supplied by a designer, information that is transformed to create an article of manufacture that uses a set of EDA processes 1012. When the design is finalized, it is taped-out 1034, which typically is when artwork (e.g., geometric patterns) for the integrated circuit is sent to a fabrication facility to manufacture the mask set, which is then used to manufacture the integrated circuit. After tape-out, a semiconductor die is manufactured 1036, and packaging and assembly processes 1038 are performed to produce the finished integrated circuit.

Specifications for a circuit or electronic structure are as used in multiple levels of useful abstraction ranging from low-level transistor material layouts to high-level description languages. Most designers start with a description using one or more modules with less detail at a high-level of abstraction to design their circuits and systems, using a hardware description language ('HDL') such as VHDL, Verilog, SystemVerilog, SystemC, MyHDL or OpenVera. The high-level description is easier for designers to understand, especially for a vast system, and can describe very complex systems that are difficult to understand using a lower level of abstraction that is a more detailed description. The HDL description can be transformed into other levels of abstraction that are used by the developers. For example, a high-level description can be transformed to a logic-level register transfer level ('RTL') description, a gate-level description, a layout-level description, or a mask-level description. Each lower abstraction level that is a less abstract description adds more useful detail into the design description, for example, more details for the modules that comprise the description. The lower-levels of abstraction that are less abstract descriptions can be generated by a computer, derived from a design library, or created by another design automation process. An example of a specification language at a lower level of abstraction language for specifying more detailed descriptions is SPICE, which is much used for detailed descriptions of circuits with many analog components. Descriptions at each level of abstraction are enabled for use by the corresponding tools of that layer (for example, a formal verification tool), and some of the modules of the abstractions need not be novel or unobvious.

A design process that uses EDA processes 1012 includes processes 1014 to 1032, which are described below. This design flow description is used only to illustrate, not to limit. For example, a designer of an integrated circuit can use the design processes in a different sequence than the sequence depicted in FIG. 10. For the embodiments disclosed herein, products from Synopsys, Inc. of Mountain View, California (hereinafter signified by 'Synopsys'), are used to enable these processes, and/or similar products from other companies.

During system design 1014, a designer specifies the functionality to be manufactured. The designer also can optimize the power, performance, and area (physical and/or lines of code) and minimize costs, etc. Partitioning of the design into different types of modules can occur at this stage. Exemplary EDA products from Synopsys that enable system design 1014 include the Model Architect, Saber, System Studio, and DesignWare products.

During the logic design and functional verification 1016, modules in the circuit are specified in one or more description languages, and the specification is checked for functional accuracy, that is, that the modules produce outputs that match the requirements of the specification of the circuit or system being designed. Exemplary HDL languages are Verilog, VHDL, and SystemC. Functional verification typically uses simulators and other programs such as test bench generators, static HDL checkers, and formal verifiers. In some situations, special systems of modules referred to as 'emulators' or 'prototyping systems' are used to speed up the functional verification. Exemplary EDA products from Synopsys that can be used at this stage include VCS, Vera, DesignWare, Magellan, Formality, ESP, and Leda products. Exemplary emulator and prototyping products available from Synopsys that enable logic design and functional verification 1016 include ZeBu® and Protolink® (® signifies 'Registered Trademark').

During synthesis and design for test 1018, HDL code is transformed to a netlist (which typically is a graph structure where the edges represent components of a circuit and where the nodes represent how the components are interconnected). Both the HDL code and the netlist are hierarchical articles of manufacture that can be used by an EDA product to verify that the integrated circuit, when manufactured, performs according to its design. This netlist can be optimized for a target semiconductor manufacturing technology. Additionally, the finished integrated circuit is tested to verify that it satisfies the requirements of the specification. Exemplary EDA products from Synopsys that enable synthesis and design for the test include the Design Compiler, Physical Compiler, Test Compiler, Power Compiler, FPGA Compiler, TetraMAX, and DesignWare products.

During netlist verification 1020, the netlist is checked for compliance with timing constraints and for correspondence with the HDL code. Exemplary EDA products from Synopsys that enable netlist verification 1020 include the Formality, Primetime, and VCS products.

During design planning 1022, an overall floor plan for the integrated circuit is constructed and analyzed for timing and top-level routing. Exemplary EDA products from Synopsys that enable design-planning 1022 include the Astro and IC Compiler products.

During layout implementation 1024, physical placement (positioning of circuit components such as transistors or capacitors) and routing (connection of the components by multiple conductors) occurs, and the selection of cells from a library to enable specific logic functions. As used herein, the term 'cell' signifies a set of transistors, other components, and interconnections that provides a Boolean logic function (e.g., AND, OR, NOT, XOR) or a storage function (such as a flip-flop or latch). As used herein, a circuit 'block' comprises two or more cells. Both a cell and a circuit block can be referred to as a module, and are enabled as both physical structures and in simulations. Parameters are specified for selected cells (based on 'standard cells') such as size and made accessible in a database for use by EDA products. Examples of databases that can be used for accessing cells include MySQL and PostgreSQL. Exemplary EDA products from Synopsys that enable layout implementation include the Astro and IC Compiler products.

During analysis and extraction 1026, the circuit function is verified at the layout level, which permits refinement of the layout design. Exemplary EDA products from Synopsys that enable analysis and extraction include the Astrorail, Primerail, Primetime, and Star RC/XT products.

During physical verification 1028, the layout design is checked to ensure that manufacturing constraints are correct, such as DRC constraints, electrical constraints, lithographic constraints, and that circuitry function matches the HDL design specification. Exemplary EDA products from Synopsys that enable physical verification 1028 include the Hercules product.

During resolution enhancement 1030, the geometry of the layout is transformed to improve how the design is manufactured. Exemplary EDA products from Synopsys that enable resolution enhancement 1030 include the *Proteus* product.

During tape-out, data is created to be used (after lithographic enhancements are applied if appropriate) for the production of lithography masks. Example EDA products from Synopsys that enable tape-out include the IC Compiler and Custom Designer products.

During mask-data preparation 1032, the 'tape-out' data is used to produce lithography masks that are used to produce finished integrated circuits. Exemplary EDA products from Synopsys that enable mask-data preparation 1032 include the CATS family of products.

For all of the abovementioned EDA products, similar products from other EDA vendors, such as Cadence, Siemens, other corporate entities, or various non-commercial products from universities, or open-source repositories, can be used as an alternative.

A storage subsystem of a computer system (such as computer system 1110 of FIG. 11A) is preferably used to store the programs and data structures that are used by some or all of the EDA products described herein, and products used for development of cells for the library and for physical and logical design that use the library.

Based on the teachings contained in this disclosure, it may be apparent to persons skilled in the relevant art(s) how to make and use embodiments of this disclosure using data processing devices, computer systems and/or computer architectures other than that shown in FIG. 11A. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way. The Detailed Description and any corresponding figures may signify, only to provide knowledge and understanding. To minimize the length of the Detailed Description, while various features, structures or characteristics may be described together in a single embodiment, they also can be used in other embodiments without being written about.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An electronic structure, comprising:
a first cell comprising:
a first shunted Josephson junction;
a first inductor connected in series with the first shunted Josephson junction at a first terminal end of the first inductor and a second terminal end of the first inductor being connected to a feed point of the first cell; and
a first resistor having a first end connected to ground and a second end connected to the first shunted Josephson junction at a terminal of the first shunted Josephson junction that is not connected to the first inductor.

2. The electronic structure of claim 1, further comprising:
a source of an electrical current that is external to the first cell, wherein the source of the electrical current is connected to the first shunted Josephson junction and the first resistor at a common point.

3. The electronic structure of claim 1, wherein an electrical current to the feed point of the first cell when powered varies by less than 10 percent.

4. The electronic structure of claim 1, wherein the first inductor is adapted to filter alternating current (AC) component of an electrical current flowing through the first inductor to the feed point of the first cell.

5. The electronic structure of claim 2, further comprising:
a second cell comprising
a second shunted Josephson junction;
a second inductor connected in series with the second shunted Josephson junction at a first terminal end of the second inductor and a second terminal end of the second inductor being connected to a feed point of the second cell; and
a second resistor having a first end connected to the ground and a second end connected to the second shunted Josephson junction at a terminal of second shunted Josephson junction that is not connected to the second inductor and at which the source of the electrical current is applied.

6. The electronic structure of claim 5, wherein the first inductor or the second inductor is a narrow or twisted strip.

7. The electronic structure of claim 5, wherein the first cell or the second cell is a parametrized cell.

8. The electronic structure of claim 5, wherein the electronic structure is implemented as one or more geometrical mask features on a mask set or an integrated circuit.

9. A method of designing an electronic structure, the method comprising:
connecting a first inductor in series with a first shunted Josephson junction at a first terminal end of the first inductor;
connecting a second terminal end of the first inductor to a feed point of a first cell comprising the first inductor, the first shunted Josephson junction, and a first resistor;
connecting a first end of the first resistor to ground and a second end of the first resistor to the first shunted Josephson junction at a terminal of the first shunted Josephson junction that is not connected to the first inductor; and
powering the first cell using an electrical current source, wherein the electrical current source is external to the first cell, and wherein the electrical current source is connected to the first shunted Josephson junction and the first resistor at a common point.

10. The method of claim 9, wherein an electrical current to the feed point of the first cell being powered varies by less than 10 percent.

11. The method of claim 9, wherein the first inductor is adapted to filter alternating current (AC) components of an electrical current flowing through the first inductor to the feed point of the first cell.

12. The method of claim 9, further comprising:
connecting a second inductor in series with a second shunted Josephson junction at a first terminal end of the second inductor;
connecting a second terminal end of the second inductor to a feed point of a second cell; and
connecting a first end of a second resistor to the ground and a second end of the second resistor to the second shunted Josephson junction at a terminal of the second shunted Josephson junction that is not connected to the second inductor and at which the electrical current source is applied.

13. The method of claim 12, further comprising:
forming the first inductor or the second inductor in a twisted strip.

14. The method of claim 12, further comprising:
designing the first cell or the second cell as a parametrized cell.

* * * * *